(12) United States Patent
Nagarajan et al.

(10) Patent No.: US 10,731,040 B2
(45) Date of Patent: Aug. 4, 2020

(54) CROSSLINKED PHENOLIC COMPOUND, METHOD OF FORMING, AND POLYMER COMPOSITION CONTAINING THE SAME

(71) Applicants: The University of Massachusetts, Boston, MA (US); The Government of the United States, As Represented By The Secretary Of The Army, Natick, MA (US)

(72) Inventors: Ramaswamy Nagarajan, Westford, MA (US); Jayant Kumar, Westford, MA (US); Ravi Mosurkal, Lowell, MA (US); Zhiyu Xia, Shrewsbury, MA (US)

(73) Assignees: THE UNIVERSITY OF MASSACHUSETTS, Boston, MA (US); THE GOVERNMENT OF THE UNITED STATES, REPRESENTED BY THE SECRETARY OF THE ARMY, Natick, MA (US)

(*) Notice: Subject to any disclaimer, the term of this patent is extended or adjusted under 35 U.S.C. 154(b) by 233 days.

(21) Appl. No.: 15/648,099

(22) Filed: Jul. 12, 2017

(65) Prior Publication Data

US 2018/0016445 A1      Jan. 18, 2018

Related U.S. Application Data

(60) Provisional application No. 62/361,034, filed on Jul. 12, 2016.

(51) Int. Cl.
| | | |
|---|---|---|
| *C09D 5/18* | (2006.01) | |
| *D06M 15/41* | (2006.01) | |
| *D06M 15/17* | (2006.01) | |
| *D01F 1/10* | (2006.01) | |

(Continued)

(52) U.S. Cl.
CPC .......... *C09D 5/185* (2013.01); *C08G 63/133* (2013.01); *C08G 63/668* (2013.01); *C08G 63/79* (2013.01);

(Continued)

(58) Field of Classification Search
CPC ...... C09D 5/185; C09D 167/00; C09K 21/14; D06M 15/273; D06M 2200/30;

(Continued)

(56) References Cited

U.S. PATENT DOCUMENTS

| | | |
|---|---|---|
| 5,114,786 A | 5/1992 | Louis |
| 5,780,060 A | 7/1998 | Levy et al. |

(Continued)

FOREIGN PATENT DOCUMENTS

| | | |
|---|---|---|
| JP | 2006233006 A | 9/2006 |
| JP | 2007092201 A | 4/2007 |
| JP | 2010254820 A | * 11/2010 |

OTHER PUBLICATIONS

English Translation of JP 2010254820 (Year: 2010).*

(Continued)

*Primary Examiner* — Andrew J. Oyer
(74) *Attorney, Agent, or Firm* — Cantor Colburn LLP

(57) ABSTRACT

A method of forming a crosslinked polyphenol, the method comprising: reacting a bio-based phenolic compound comprising at least one phenolic hydroxyl group, with a crosslinking agent comprising at least two functional groups reactive with the phenolic hydroxyl group, wherein the at least two functional groups are each independently a halogen group, acid halide group, sulfonyl halide group, glycidyl group, anhydride group, or a combination comprising at least one of the foregoing, to provide the crosslinked polyphenol.

20 Claims, 5 Drawing Sheets

| OVEN TEMP. (°C) | TANNIC ACID (TA) | | MODIFIED TANNIC ACID (TAT) | |
|---|---|---|---|---|
| | BEFORE HEATING | AFTER 30 MIN. | BEFORE HEATING | AFTER 30 MIN. |
| 175 | | | | |
| 200 | | | | |
| 230 | | | | |

(51) Int. Cl.
*C09K 21/14* (2006.01)
*C08G 63/668* (2006.01)
*C08G 63/79* (2006.01)
*C08G 63/81* (2006.01)
*C08G 63/133* (2006.01)
*C09D 167/00* (2006.01)
*D06M 15/273* (2006.01)
*C08L 77/06* (2006.01)
*C08L 77/02* (2006.01)

(52) U.S. Cl.
CPC .......... *C08G 63/81* (2013.01); *C09D 167/00* (2013.01); *C09K 21/14* (2013.01); *D01F 1/10* (2013.01); *D06M 15/17* (2013.01); *D06M 15/273* (2013.01); *D06M 15/41* (2013.01); *C08L 77/02* (2013.01); *C08L 77/06* (2013.01); *C08L 2201/02* (2013.01); *D06M 2200/30* (2013.01)

(58) Field of Classification Search
CPC ...... C08G 63/133; C08G 63/81; C08G 63/79; C08G 63/668; C08L 77/06; C08L 77/02; C08L 2201/02
See application file for complete search history.

(56) References Cited

U.S. PATENT DOCUMENTS

| | | |
|---|---|---|
| 5,844,033 A | 12/1998 | Nikkeshi et al. |
| 6,624,258 B1 | 9/2003 | Nikkeshi |
| 7,118,617 B2 | 10/2006 | Asano et al. |
| 9,080,001 B2 | 7/2015 | Kumar et al. |
| 9,089,730 B2 | 7/2015 | Shalev et al. |
| 9,260,579 B2 | 2/2016 | Cobb et al. |
| 2009/0036591 A1* | 2/2009 | Jin .......................... C08K 3/36 524/493 |
| 2016/0068553 A1 | 3/2016 | Matsuda et al. |

OTHER PUBLICATIONS

Lang, X., "Low Flammability Foam-Like Materials Based on Epoxy, Tannic Acid, Sodium Montmorillonite Clay", Department of Macromolecular Science and Engineerins, Case Western Reserve University (2014), pp. 1-63.

Lyon, R. E., Walters, R. N. "Pyrolysis Combustion Flow Calorimetry", Journal of Analytical and Applied Pyrolysis, 71 (2004) pp. 27-46.

Sahiner, Nurettin et al. "Single Step Natural Poly(Tannic Acid) Particle Preparation as Multitalented Biomaterial", Materials Science and Engineering C, (2015), pp. 824-834.

Tributsch, H. Fiechter, S. "The Material Strategy of Fire-Resistant Tree Barks", High Performace Structures and Materials IV, WIT Transactions on The Built Environment, vol. 97 (2008) pp. 43-52.

Zhang, Yan et al. "Composite Nanofiltration Membranes Prepared by Interfacial Polymerization with Natural Material Tannic Acid and Trimesoyl Chloride", Journal of Membrane Science, 429 (2013), pp. 235-242.

* cited by examiner

CROSSLINKED PHENOLIC COMPOUND, METHOD OF FORMING, AND POLYMER COMPOSITION CONTAINING THE SAME

CROSS REFERENCE TO RELATED APPLICATIONS

This application claims priority to and the benefit of Provisional Patent Application Ser. No. 62/361,034, filed on Jul. 12, 2016, in the United States Patent and Trademark Office.

FEDERAL RESEARCH STATEMENT

This disclosure was made with government support under Grant No. W911NF-11-D-0001, awarded by the US Army Research Laboratory. The government has certain rights in the disclosure.

BACKGROUND

Flame retardant (FR) additives can be used to control or reduce the risk of fire in plastic, i.e., polymer, products. On average, approximately 909,000 tons per year of FR additives are used in the plastic industry alone to make plastic materials less flammable.

Flame retardancy can be achieved by blending polymers with FR additives such as halocarbons (e.g., polybrominated diphenyl ether), phosphorous compounds, organophosphorus compounds, and metal oxides. While small molecule FRs provide a convenient means for reducing the flammability of materials, the small molecule additives can leach out from plastic products during use or after disposal, and can lead to a variety of environmental and health concerns related to contamination and bioaccumulation. With the European Union banning the use of several halogenated FR additives, there remains a need for the development of environmentally friendly, safer, low leaching alternative FR polymers and additives that are suitable for high performance polymers that can be processed at relatively high temperatures. In particular, it would be highly advantageous to develop FR additives that are considered safer and suitable for high performance polymers that are processed at higher temperatures such as polyamides.

BRIEF DESCRIPTION

According to an embodiment, a method of forming a crosslinked polyphenol comprises reacting a bio-based phenolic compound comprising at least one phenolic hydroxyl group, with a crosslinking agent comprising at least two functional groups reactive with the phenolic hydroxyl group, wherein the at least two functional groups are each independently a halogen group, acid halide group, sulfonyl halide group, glycidyl group, anhydride group, or a combination comprising at least one of the foregoing, to provide the crosslinked polyphenol.

Another embodiment is a crosslinked polyphenol, preferably produced from a natural product phenolic compound, more preferably produced from a tannin, a hydrolysable tannin, or quercetin, catechin, epicatechin, anthocyanidin, gallic acid, digallic acid, methyl gallate, ellagic acid, hexahydroxydiphenic acid, luteic acid, casuarictin, gallotannin, ellagitannin, or a combination comprising at least one of the foregoing.

According to another embodiment, a polymer composition comprises a polymer; and 2 to 0 weight percent of the crosslinked polyphenol.

According to still another embodiment, a flame-retardant fabric comprises a woven or non-woven fabric substrate; and a coating on a surface of the fabric substrate, the coating comprising the crosslinked polyphenol.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
FIG. 1 is a Table showing photographic images of tannic acid and modified tannic acid after heating over time at different temperatures.

Disclosed herein is a crosslinked polyphenol and polymer composition suitable as an FR additive for polymers and fabrics. The crosslinked polyphenol can be prepared through polycondensation of a bio-based phenolic compound having at least one hydroxyl group with a crosslinking agent having at least two functional groups. Relative to the non-crosslinked natural polyphenol compound, the crosslinked polyphenol can provide enhanced thermal stability and char yield with reduced heat release characteristics. The crosslinked polyphenol can be melt-processable with polymers, including polyamides, and can improve the char yield and lower the heat release characteristic of a prepared polymer composition. In a specific embodiment, the natural product phenolic compound can be a tannin, and can be used to improve flame retardancy in some low melting thermoplastic polymers, particularly where color is of less concern.

A method of forming the crosslinked polyphenol includes reacting a bio-based phenolic compound comprising at least one phenolic hydroxyl group with a crosslinking agent comprising at least two functional groups. As used herein, the term "bio-based phenolic compound" means a natural product phenolic compound or a phenolic compound based on the structure of a natural product phenolic compound (e.g., bio-inspired). In an embodiment, the bio-based phenolic compound includes one phenolic hydroxyl group. However, the presence of two or more phenolic hydroxyl groups can provide higher crosslink densities, or other desired characteristics. Accordingly, in another embodiment, the bio-based phenolic compound comprises at least two phenolic hydroxyl groups, or at least three phenolic hydroxyl groups, or at least five phenolic hydroxyl groups. Even more phenolic hydroxy groups can be present in compounds having multiple ring systems, for example up to 50 phenolic hydroxyl groups. In some embodiments, the bio-based phenolic compound can comprise 1 to 50, or 2 to 50, or 1 to 30, or 2 to 30, or 1 to 10, or 2 to 10, or 1 to 5, or 2 to 5 phenolic hydroxy groups.

In an embodiment, the bio-based phenolic compound is a natural product, i.e., a product that is found in or derived from a natural source, such as a plant or animal source. Bio-based phenols that are natural products can be obtained directly from the natural source, or from other processes such as fermentation. In addition, some bio-based phenols, such as gallic acid, are found in natural sources, but can be chemically synthesized from other feedstocks. In a preferred embodiment, the bio-based phenols are natural products that are derived from a natural source, such as a plant. The bio-based phenols can be used as isolated from the natural source, or further modified, for example hydrolyzed or partially derivatized. For example, the bio-based phenolic compound can be quercetin, catechin, epicatechin, anthocyanidin, gallic acid, digallic acid, methyl gallate, ellagic acid, hexahydroxydiphenic acid, luteic acid, casuarictin, or a combination comprising at least one of the foregoing.

In an embodiment, the bio-based phenolic compound can be a tannin. There are two major classes of tannins: condensed tannins and hydrolysable tannins. Both types of tannins, after crosslinking, can be used to improve flame retardancy in low melting thermoplastic polymers. Hydrolysable tannins have several major advantages over condensed tannins, such as a less conjugated structure, higher solubility in most organic solvents, and a lighter color. Tannic acid is a major commercial form of hydrolysable tannin. It has up to twelve galloyl (1,2,3-benzene triol) units covalently attached to a glucose core through ester linkages. The commercially available tannic acid ($C_{76}H_{52}O_{46}$) is usually a mixture of different gallotannins with an average of ten galloyl units attached to the glucose core as shown in formula (1).

(1)

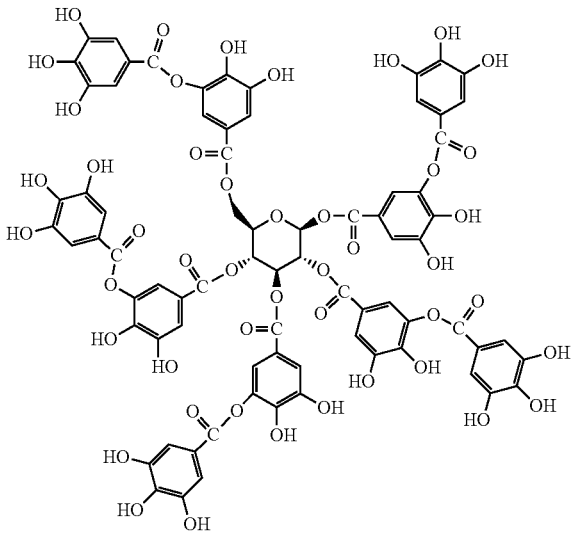

In a specific embodiment, the bio-based phenolic compound can be a condensed tannin such as proanthocyanidins, polyflavonoid tannins, catechol-type tannins, pyrocatecolic-type tannins, and flavolans; a hydrolysable tannin such as ellagitannins and gallotannins; or a combination comprising at least one of the foregoing. The bio-based phenolic compound can also refer to a mixture of bio-based phenolic compounds, for example tannic acid having a mixture of gallotannins with an average of ten galloyl units.

The crosslinking agent includes at least two functional groups, for example two functional groups, three functional groups, or four functional groups. As used herein, "functional groups" and "crosslinking functional groups" are synonymous terms. The functional groups are reactive with the hydroxyl group(s) of the bio-based phenolic compound under the appropriate reaction conditions. The functional groups can each independently be a halogen group, acid halide group, glycidyl group, anhydride group, or sulfonyl halide groups, or a combination comprising at least one of the foregoing. As used herein, dihalogen groups such as phosphinyl dihalide (—P(halide)$_2$) groups, dihalophosphinylsulfide (—P(halide)$_2$(=S) group are considered to be two functional halogen groups.

The functional groups are linked to a hydrocarbon group, for example a hydrocarbon group having 1 to 60 carbon atoms. Thus, the crosslinking agent can be aliphatic (having no aromatic groups) or aromatic (i.e., containing at least one aryl or heteroaryl group). The aliphatic groups can contain from 1 to 60 carbon atoms, and optionally can be heteroaliphatic, for example heteroalkyl. The aromatic groups can have 3 to 60 carbon atoms.

In an embodiment, the crosslinking agent is an aromatic or aliphatic dianhydride, for example 3,3',4,4'-biphenyltetracarboxylic dianhydride, 4,4'-oxydiphthalic anhydride, 4,4'-(4,4'-isopropylidenediphenoxy)bis(phthalic anhydride), benzophenone-3,3',4,4'-tetracarboxylic dianhydride, or the like.

The crosslinking agent can be an aromatic or aliphatic sulfonyl dichloride, for example benzene-1,3-disulfonyl chloride, biphenyl-4,4'-disulfonyl chloride, 4,4'-methylenebis(benzenesulfonyl chloride), 9-oxo-9H-fluorene-2,7-disulfonyl dichloride, or the like.

Alternatively, the crosslinking agent can be an aromatic or aliphatic phosphine dichloride, for example P,P-dichlorophenylphosphine, dimethylphosphoramidous dichloride, diphenylphosphoramidous dichloride, dichloromethylphosphine, or the like.

In still another embodiment, the crosslinking agent can be an aromatic or aliphatic dichlorophosphine sulfide, for example dichloro(phenyl)phosphine sulfide, or the like.

In a preferred embodiment, the crosslinking agent is an aromatic crosslinking agent, for example an aromatic halide, an aromatic anhydride, an aromatic sulfonyl halide, an aromatic phosphinyl dihalide, an aromatic dihalophosphinyl sulfide, an aromatic phthaloyl halide, an aromatic glycidyl ether, a halobenzene, or a combination comprising at least one of the foregoing.

A specific example of an aromatic halide is cyanuric chloride (2,4,6-trichloro-1,3,5-triazine), 1,3,5-triphosphinine-2,4,6-chloride, P,P-dichlorophenylphosphine, or the like. Specific examples of aromatic anhydrides, aromatic sulfonyl halides, aromatic phosphinyl dihalides, and aromatic dihalophosphinyl sulfides are given above.

The phthaloyl halide can be of formula (2).

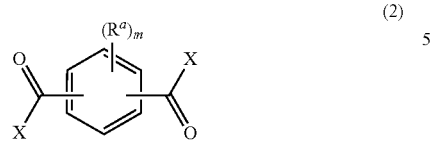
(2)

In formula (2), each $R^a$ is the same or different, and is $C_{1-12}$ alkyl, $C_{6-12}$ aryl, or —C(O)X; each X is independently a halogen, for example fluorine, chlorine, or bromine; and m is 0 to 4, such that when m is less than 4, the valence of each carbon of the ring is filled by hydrogen. The acyl halide groups (i.e., —C(O)X) can be disposed ortho, meta, or para to each other on the arylene group. In an embodiment, m is 1 and $R^a$ is —C(O)X (trimesoyl halide, specifically trimesoyl chloride). For example, the phthaloyl halide can be o-phthaloyl halide (i.e., phthaloyl dihalide), m-phthaloyl halide (i.e., isophthaloyl dihalide), or p-phthaloyl halide (i.e., terephthaloyl dihalide). In an embodiment, the phthaloyl halide is a phthaloyl chloride such as o-phthaloyl chloride, m-phthaloyl chloride, p-phthaloyl chloride, a phthaloyl fluoride such as tetrafluorophthaloyl fluoride, a phthaloyl bromide such as o-phthaloyl bromide, m-phthaloyl bromide, p-phthaloyl bromide, or a combination comprising at least one of the foregoing.

The aromatic glycidyl ether can be of formula (3) or formula (4).

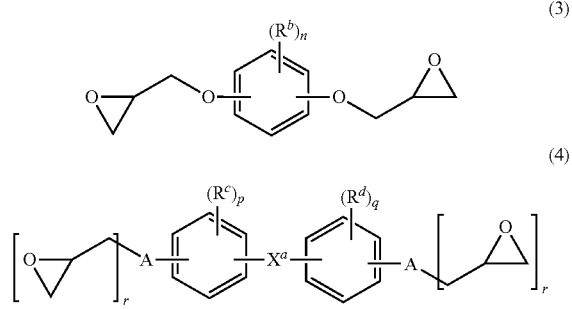

In the formulae (3) and (4), each $R^b$ is the same or different, and is $C_{1-12}$ alkyl, $C_{6-12}$ aryl, or glycidyl ether; each $R^c$ and $R^d$ is the same or different, and is $C_{1-12}$ alkoxy, or $C_{1-12}$ alkyl; each A is the same or different, and is O or N. $X^a$ is a bridging group connecting two aromatic groups, where the bridging group and the A substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, $C_{3-18}$ cycloalkylidene, $C_{1-25}$ alkylidene of the formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, cyclic $C_{7-12}$ heteroarylalkyl, or $C_{6-12}$ aryl (glycidyl ether). In formulae (3) and (4), n, p, and q are each independently 0 to 4, such that when n, p, or q is less than 4, the valence of each carbon of the ring is filled by hydrogen. In formula (4), r is 1 or 2, provided the valency of A is not exceeded. For example, the aromatic glycidyl ether can be bisphenol A diglycidyl ether, resorcinol diglycidyl ether, tris(4-hydroxyphenyl)methane triglycidyl ether, 4,4'-methylenebis(N,N-diglycidylaniline), or a combination comprising at least one of the foregoing.

The halobenzene can be of formula (5):

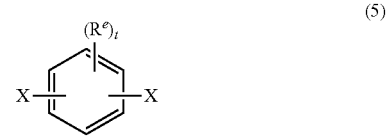
(5)

In formula (5), each $R^e$ is the same or different, and is $C_{1-12}$ alkyl, $C_{6-12}$ aryl, or —X; each X the same or different, and is a halogen, for example chlorine or bromine; and t is 0 to 4, such that when t is less than 4, the valence of each carbon of the ring is filled by hydrogen. For example, the halobenzene can be dichlorobenzene (i.e., o-dichlorobenzene, m-dichlorobenzene, p-dichlorobenzene), trichlorobenzene (i.e., 1,2,4-trichlorobenzene, 1,3,5-trichlorobenzene, and 1,2,3-trichlorobenzene), dibromobenzene (i.e., o-dibromobenzene, m-dibromobenzene, p-dibromobenzene), tribromobenzene (i.e., 1,2,4-tribromobenzene, 1,3,5-tribromobenzene, and 1,2,3-tribromobenzene), 1-bromo-2-chlorobenzene, 1-bromo-4-chlorobenzene, 1-bromo-3-chlorobenzene, or a combination comprising at least one of the foregoing.

In an embodiment, the crosslinking agent is phthaloyl chloride, bisphenol A diglycidyl ether, resorcinol diglycidyl ether, tris(4-hydroxyphenyl)methane triglycidyl ether, 4,4'-methylenebis(N,N-diglycidylaniline), dichlorobenzene, trichlorobenzene, or a combination comprising at least one of the foregoing.

The bio-based phenolic compound and the crosslinking agent are present in the reaction mixture in an amount effective to produce the desired degree of crosslinking and the desired properties. For example the bio-based phenolic compound and the crosslinking agent can be present in the reaction mixture in a mole ratio of phenolic hydroxyl groups to crosslinking functional groups of 0.4:1 to 2:1, or 0.6:1 to 1.8:1, or 0.8:1 to 1.7:1, or 0.9:1 to 1.5:1, or 1:1 to 1.5:1, or 1:1 to 1.4:1, or 0.8:1 to 1.3:1, or 0.9:1 to 1.2:1.

In an embodiment, the reacting comprises a polycondensation reaction. Conditions for the polycondensation can vary, depending on the desired starting materials, the desired reaction conditions, the desired properties of the product, and like considerations. In an embodiment, the polycondensation is an interfacial polycondensation reaction of the bio-based phenolic compound and the crosslinking agent in the presence of a phase transfer catalyst, optionally a catalyst, or both. Although the reaction conditions for interfacial polycondensation reactions can vary, an exemplary process generally involves dissolving or dispersing the bio-based phenolic compound in aqueous base, for example NaOH or KOH, combining the resulting mixture with a water-immiscible solvent, and contacting the reactants with the crosslinking agent, optionally in the presence of a catalyst, a phase transfer catalyst, or both, under controlled pH conditions, e.g., 8 to 10. The water-immiscible solvent can be, for example, chloroform, methylene chloride, 1,2-dichloroethane, chlorobenzene, toluene, or the like.

Among the phase transfer catalysts that can be used are catalysts of the formula $(R^3)_4QX$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_2(CH_2)_3)_3NX$, and $CH_3(CH_3(CH_2)_2)_3NX$, wherein X is $Cl^-$, $Br^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of bio-based phenolic compound in the reaction.

The optional catalyst can be a tertiary amine. In some embodiments, the tertiary amine can also function as an acid neutralizer. Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. An effective amount of the catalyst can be 0.01 to 5 wt %, or 0.1 to 2 wt %, each based on the weight of bio-based phenolic compound in the reaction. When used as an acid neutralizer, the tertiary amine can be used in an amount of 10 wt % to 200 wt %, based on the weight of the bio-based phenolic compound in the reaction.

The relative amount of the bio-based phenolic compound and the crosslinking agent can vary depending on the identity of each, their reactivity, and the desired degree of crosslinking. In general, an excess of the crosslinking agent is used in order to promote more complete reaction of the phenol groups. For example, greater than 10, or greater than 50, or greater than 100 equivalents of crosslinking agent can be used per phenol.

Alternatively, the polycondensation reaction can be performed in an organic solvent in the presence of a catalyst. The solvent is selected to be effective to dissolve both the bio-based phenolic compound and the crosslinking agent. Such solvents can include polar aprotic solvents such as acetone, methyl isobutyl ketone, ethyl methyl ketone, acetonitrile, dimethyl formamide (DMF), dimethyl sulfoxide (DMSO), dimethyl phenylpropionamide, dimethyl chlorobenzamide, dimethyl bromobenzamide, pyridine, sulfolane, tetrahydrofuran (THF), dimethoxy ethane, and the like.

The catalyst can be a tertiary amine as described above. Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. An effective amount of the catalyst can be 0.01 to 5 wt %, or 0.1 to 2 wt %, each based on the weight of bio-based phenolic compound in the reaction. A tertiary amine can also be used as an acid neutralizer in an amount of 10 wt % to 200 wt %, based on the weight of the bio-based phenolic compound in the reaction.

The reaction can be carried out at a temperature effective to promote the reaction, preferably to ensure substantially complete conversion in a reasonable amount of time (i.e., less than 24 hours, preferably less than 12 hours, or less than 4 hours). The temperature is preferably low enough to lessen or minimize the formation of undesirable side-products. For example, the reaction can be carried out at 21 to 100° C., or 45 to 90° C.

In either embodiment, isolation of the crosslinked polyphenol can proceed by standard procedures. For example, the crosslinked polyphenol can precipitate from the interfacial reaction, and be isolated by filtration. Alternatively, the organic solvent can be removed to provide a residue that can be subsequently washed or extracted.

Another embodiment herein is a crosslinked polyphenol natural product as described above, wherein the crosslinking agent has at least two functional groups as described above. In a specific embodiment, the crosslinked polyphenol natural product comprises a tannin, hydrolyzed tannin, quercetin, catechin, epicatechin, anthocyanidin, gallic acid, digallic acid, methyl gallate, ellagic acid, hexahydroxydiphenic acid, luteic acid, casuarictin, or a combination comprising at least one of the foregoing, and the crosslinking agent is preferably an aromatic crosslinking agent comprising at least two halide groups, acid halide groups, glycidyl groups, anhydride groups, or a combination comprising at least one of the foregoing.

In an embodiment, the crosslinked polyphenol has a weight loss of less than or equal to 3 weight percent (wt %), as determined by thermogravimetric analysis comprising heating the crosslinked polyphenol from 23 to 235° C. at a rate of 20° C. per minute. For example, the crosslinked polyphenol can have a weight loss of 0.1 to 3 wt %, 0.5 to 3 wt %, 1 to 3 wt %, 1.5 to 3 wt %, or 2 to 3 wt %, as determined by thermogravimetric analysis comprising heating the crosslinked polyphenol from 23 to 235° C. at a rate of 20° C. per minute.

In an embodiment, the crosslinked polyphenol has a char yield of at least 35 wt %, as determined by thermogravimetric analysis comprising heating the product from 23 to 750° C. at a rate of 20° C. per minute. For example, the crosslinked polyphenol can have a char yield 35 to 60 wt %, 35 to 55 wt %, 35 to 50 wt %, 40 to 60 wt %, 45 to 60 wt %, or 50 to 60 wt %, as determined by thermogravimetric analysis comprising heating the crosslinked polyphenol from 23 to 750° C. at a rate of 20° C. per minute.

Also provided is a polymer composition comprising a polymer; and 2 to 30 wt % of a crosslinked polyphenol, based on the total weight of the polymer and the crosslinked polyphenol. In another embodiment, the polymer composition includes the crosslinked polyphenol in an amount of 2 to 28 wt %, 2 to 25 wt %, 2 to 20 wt %, 3 to 20 wt %, 3 to 18 wt %, 3 to 15 wt %, 4 to 12 wt %, 5 to 10 wt %, or 6 to 9 wt %, based on the total weight of the polymer and the crosslinked polyphenol.

The polymer can be of any type, including a thermoplastic, a thermoplastic elastomer, an elastomer, a thermoset, or a combination comprising at least one of the foregoing.

Examples of thermoplastic polymers that can be used include polyacetals (e.g., polyoxyethylene and polyoxymethylene), poly($C_{1-6}$ alkyl)acrylates (including poly(methyl methacrylate) and poly(butyl acrylate)), polyacrylamides, polyamides, (e.g., aliphatic polyamides, polyphthalamides, and polyaramides including synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6), polyamideimides, polyanhydrides, polyarylates, polyarylene ethers (e.g., polyphenylene ethers), polyarylene sulfides (e.g., polyphenylene sulfides), polyarylene sulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes, polysulfides, polysulfonamides, polysulfonates, polysulfones (e.g., polyarylsulfones and polyethersulfones), polythioesters, polytriazines, polyureas, polyurethanes, polyvinyl alcohols, polyvinyl esters (e.g., poly(vinyl acetate)), polyvinyl ethers, polyvinyl halides (e.g., poly(vinyl chloride)s and poly(vinyl fluoride)s), polyvinyl ketones, polyvinyl thioethers, polyvinylidene fluorides, or the like, or a combination comprising at least one of the foregoing thermoplastic polymers.

Representative examples of polyolefins are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers derived further including units derived from copolymerizable ethylenically unsaturated monomers, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers.

The polymer can be a thermoplastic elastomer such as unhydrogenated and hydrogenated block copolymers of styrene and a conjugated diene, elastomeric alloys (including thermoplastic vulcanizates), or a combination comprising at least one of the foregoing. For example, the polymer can be a thermoplastic elastomer such as natural rubber, polybutadienes, polyisoprenes, copolymers of isobutylene and isoprene, copolymers of styrene and butadiene (styrene-butadiene rubber), copolymers of polybutadiene and acrylonitrile, polychloroprenes, copolymers of ethylene and an alpha-olefin (including copolymers of ethylene and propylene, and copolymers of ethylene and 1-octene), polysiloxanes, fluorosilicone rubbers, copolymers of ethylene and vinyl acetate, or a combination comprising at least one of the foregoing.

The polymer can be a thermoset such as those derived from epoxy resins, cyanate ester resins, maleimide resins, benzoxazine resins, polyurethanes, vinylbenzyl ether resins, alkene- or alkyne containing monomers, arylcyclobutene resins, perfluorovinyl ether resins, polyureas, and oligomers and polymers with curable vinyl functionality, or a combination comprising at least one of the foregoing. Polyurethanes that can be used include aliphatic, cycloaliphatic, aromatic, and polycyclic polyurethanes.

In an embodiment, the polymer comprises a polycarbonate, a polyester, a polyamide, a polyimide, a polyetherimide, a polyurethane, a polystyrene, a poly(phenylene ether), a poly(phenylene sulfide), a polyarylsulfone, a polyethersulfone, a poly(ether ketone), a poly(meth)acrylate, a poly(vinyl butyral), a polyolefin, a poly(vinyl acetate), a polyacrylonitrile, a poly(vinyl chloride), a poly(vinyl fluoride), a poly(vinylidene fluoride), a polytetrafluoroethylene, a copolymer of vinylidene chloride and vinyl chloride, a copolymer of vinyl acetate and vinylidene chloride, a copolymer of styrene and acrylonitrile, natural rubber, a polybutadiene, a polyisoprene, a copolymer of isobutylene and isoprene, a copolymer of styrene and butadiene, a copolymer of polybutadiene and acrylonitrile, a polychloroprene, a copolymers of ethylene and an alpha-olefin, a polysiloxane, a fluorosilicone rubber, a copolymer of ethylene and vinyl acetate, an epoxy resin, a cyanate ester resin, a maleimide resin, a benzoxazine resin, a vinylbenzyl ether resin, an alkene- or alkyne containing monomers, an arylcyclobutene resin, a perfluorovinyl ether resin, a polyurea, or a combination comprising at least one of the foregoing. In another embodiment, the polymer comprises a polyamide, polyimide, polyester, polyurea, polyurethane, or a combination comprising at least one of the foregoing. In still another embodiment, the polymer comprises a polyamide.

The polymer compositions can further include a secondary flame retardant or a flame retardant synergist. In an embodiment, the composition includes 1 to 40 parts by weight, or 1 to 30 parts by weight, or 1 to 20 parts by weight, or 1 to 10 parts by weight of a secondary flame retardant or a flame retardant synergist, based on the total parts by weight of the polymer and the crosslinked polyphenol. There is no particular limit on the secondary flame retardant, which can be a halogenated flame retardant in some embodiments. Use of the crosslinked polyphenol can allow the polymer compositions to achieve a high degree of flame retardance using less of the halogenated flame retardants.

However, preferred secondary flame retardants and flame retardant synergists include non-brominated and non-chlorinated organic phosphorus-containing flame retardants, for example organic phosphates and organic compounds containing phosphorus-nitrogen bonds. In an embodiment, the secondary flame retardant or the flame retardant synergist comprises an organophosphate ester, a metal di($C_{1-12}$ alkyl) phosphinate, a bis(phenoxy)phosphazene, a melamine flame retardant, a metal hydroxide, a metal oxide, or a combination comprising at least one of the foregoing.

One type of phosphate is an aromatic organophosphate ester of the formula $(GO)_3P=O$, wherein each G is independently a $C_{1-12}$ alkyl, $C_{3-8}$ cycloalkyl, $C_{6-12}$ aryl, $C_{7-13}$ alkylarylene, or $C_{7-13}$ arylalkylene group, provided that at least one G is an aromatic group. Two of the G groups can be joined together to provide a cyclic group. Aromatic phosphates include, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like. Other specific organic phosphorus-containing flame retardants include resorcinol bis(diphenyl phosphate), also known as RDP, and bisphenol A bis(diphenyl phosphate), also known as BPADP.

Flame retardant compounds containing phosphorus-nitrogen bonds include phosphazenes, phosphonitrilic chloride, phosphorus ester amides, phosphoric acid amides, phosphonic acid amides, phosphinic acid amides, and tris(aziridinyl) phosphine oxide. Specific examples include piperazine-type phosphoramides, and phosphazenes and cyclic phosphazenes such as phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Melamine flame retardants include melamine cyanurate, melamine borate, melamine phosphates, melamine polyphosphates, melamine pyrophosphates, melamine ammonium polyphosphates, and melamine ammonium pyrophosphates.

Inorganic flame retardants and flame retardant synergists can also be used, for example salts of $C_{2-16}$ alkyl sulfonates such as potassium perfluorobutane sulfonate (Rimar salt), potassium perfluoroctane sulfonate, and tetraethylammonium perfluorohexane sulfonate, salts of aromatic sulfonates such as sodium benzene sulfonate, sodium toluene sulfonate (NATS), and the like, salts of aromatic sulfone sulfonates such as potassium diphenylsulfone sulfonate (KSS), and the like; salts formed by reacting for example an alkali metal or alkaline earth metal (e.g., lithium, sodium, potassium, magnesium, calcium and barium salts), and an inorganic acid complex salt, for example, an oxo-anion (e.g., alkali metal and alkaline-earth metal salts of carbonic acid, such as $Na_2CO_3$, $K_2CO_3$, $MgCO_3$, $CaCO_3$, and $BaCO_3$, or a fluoroanion complex such as $Li_3AlF_6$, $BaSiF_6$, $KBF_4$, $K_3AlF_6$, $KAlF_4$, $K_2SiF_6$, or $Na_3AlF_6$ or the like; metal hydroxides such as magnesium hydroxide, aluminum hydroxide, barium hydroxide, calcium hydroxide, cobalt hydroxide, zinc hydroxide, or the like; metal oxides such as titanium dioxide, aluminum oxide, magnesium oxide, calcium oxide, zinc oxide, tin oxide, or the like; or metal di($C_{1-12}$ alkyl)phosphinates such as di($C_{1-12}$ alkyl)phosphinic salts of Mg, Ca, Al, Sb, Sn, Ge, Ti, Zn, Fe, Zr, Ce, Bi, Sr, Mn, Li, Na, and/or K, for example aluminum tris(diethylphosphinate)), or the like.

Char promoters such as zinc borate can also be added to the composition.

The polymer composition can further include an additive composition comprising one or more additives selected to achieve a desired property, with the proviso that the additive composition is selected so as to not significantly adversely affect a desired property of the polymer composition. Each additive can be soluble or non-soluble in the other components of the polymer composition. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, anti-drip agent (e.g., a PTFE-encapsulated styrene-acrylonitrile copolymer (TSAN)), or a combination comprising at least one of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

In the polymer compositions, at least a portion of the crosslinked polyphenol can be present in the form of a coating on a particle (i.e., surface-coated particles). The particle can be of any suitable material, including an organic or inorganic material, or a combination comprising at least one of the foregoing materials. In an embodiment, the bio-based phenolic compound can be disposed on a surface of an inorganic particle, wherein the inorganic particle is a metal hydroxide, a metal oxide, or a combination comprising at least one of the foregoing. In a specific embodiment the inorganic particle is a metal oxide, to provide metal oxide particles surface-coated with the crosslinked polyphenol. For example, the metal oxide particles can be titanium dioxide, zinc oxide, iron oxide, silicon dioxide, vanadium oxide, manganese oxide, aluminum oxide, tin oxide, magnesium oxide, calcium oxide, strontium oxide, or a combination comprising at least one of the foregoing. In an embodiment, the metal oxide particles can be titanium dioxide, aluminum oxide, magnesium oxide, calcium oxide, zinc oxide, tin oxide, or a combination comprising at least one of the foregoing. In another specific embodiment, the inorganic particle is a metal hydroxide, to provide metal hydroxide particles surface-coated with the crosslinked polyphenol. For example, the metal hydroxide particles can be magnesium hydroxide, aluminum hydroxide, barium hydroxide, calcium hydroxide, cobalt hydroxide, zinc hydroxide, or a combination comprising at least one of the foregoing.

The average particle size of the coated particles can be, for example, 0.01 to 5 micrometers (μm), or 0.05 to 3 μm, or 0.1 to 1 μm, or 0.2 to 0.8 μm, or 0.3 to 0.6 μm. The particles can be prepared using any suitable method, including those available in the art, such as dispersion coating in the gas or liquid phase. Coating of the particles can be by methods known in the art, for example simply by stirring the particles and the polymer compositions. Alternatively, the crosslinking can be performed in the presence of the particles, and the crosslinked composition later dispersed in the polymer composition and optional additive composition. The surface of the particles can optionally be treated with an adhesion promoter, for example a silane or a zirconate as is known in the art.

The polymer compositions can be manufactured by various methods known in the art. For example, when the polymer is a thermoplastic, the crosslinked polyphenol, the polymer, and other optional components can be blended, optionally with any fillers, in a high speed mixer or by hand mixing. The blend can then be fed into the throat of a twin-screw extruder via a hopper. Alternatively, at least one of the components can be incorporated into the polymer composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

In other embodiments, for example where the polymer is a thermoset, the crosslinked polyphenol, the polymer resin, and other optional components can be combined, for example in a solvent, the thermosetting composition can optionally be formed into a shape (for example cast or molded), and then crosslinked to provide the thermoset polymer composition. Crosslinking the polymer resin can be by the appropriate mechanism, e.g., by the application of heat or ultraviolet or other light.

The polymer compositions have excellent physical properties, including a heat release capacity (HRC) of less than or equal to 80 joules/gram-Kelvin (J/g-K), for example 10 to 80 J/g-K, or 20 to 80 J/g-K, or 30 to 80 J/g-K, or 40 to 80 J/g-K, or 50 to 80 J/g-K, or 60 to 80 J/g-K, as determined by pyrolysis combustion flow calorimetry (PCFC). PCFC is a tool for assessing the flammability of a polymer composition, as described in R. E. Lyon and R. N. Walters, "Pyrolysis combustion flow calorimetry", *Journal of Applied Pyrolysis,* 2004, volume 71, pages 27-46. PCFC is also known as microscale combustion calorimetry. HRC can be measured according to ASTM D7309.

The polymer compositions can further have a peak heat release rate (pHRR) of less than or equal to 50 watts/gram (W/g), for example 10 to 50 W/g, or 20 to 50 W/g, or 30 to 50 W/g, or 40 to 50 W/g, as determined by pyrolysis combustion flow calorimetry (PCFC). pHRR can be measured according to ASTM D7309.

Articles can be prepared that include the crosslinked polyphenol or the polymer compositions comprising the crosslinked polyphenol. Also provided are kits for applying the crosslinked polyphenol or the composition comprising the crosslinked polyphenol to an article. For example, crosslinked polyphenol or the polymer composition comprising the crosslinked polyphenol can be used in or as a fire-resistant coating material. The fire-resistant coating material can be used, for example, for indoor structures, structural steels, wire wraps or cable wraps, foaming materials, flammable objects in vehicles, fabrics, clothing, consumer products including electronics, or the like.

Also provided is a flame-retardant fabric comprising a woven or non-woven fabric substrate and a coating on a surface of the fabric substrate, where the coating includes the crosslinked polyphenol. Any suitable material can be used as the fabric substrate, including polymers as described above, or natural fibers, for example linen, wool, cotton, jute, or the like. A combination of different types of fibers can be used. The fibers can be in any suitable form, for example single, twisted, knitted, or the like. In an embodiment, the woven or non-woven fabric substrate comprises polyamide fibers.

In another embodiment, the coating forms an intumescent char and induces surface crosslinking of a fiber of the substrate upon burning. The intumescent char, or intumescent coating, also can be referred to as subliming, foaming, or ablative coatings.

The flame-retardant fabric can be prepared using any suitable method. For example, it can be applied to the fabric substrate by brush coating, roller coating, blade coating, or spray coating. The spray coating includes, for example, hot spray coating, air spray coating, airless spray coating, air-mix-assistant spray coating, high-volume low-pressure spray coating, low-volume medium-pressure spray coating, or the like.

In an embodiment, the flame retardant fabric comprising the coating has a char length of less than 5 inches, or less than 4.8 inches, or less than 4.6 inches, or less than 4.4 inches, or less than 4.2 inches, or less than 4 inches, or less than 3.8 inches, or less than 3.6 inches, or less than 3.4 inches, or less than 3.2 inches, as measured by a vertical flame test in accordance with ASTM D6143.

In another embodiment, the flame retardant fabric comprising the coating has an after flame time of less than 18 seconds (s), or less than 16 s, or less than 14 s, or less than 12 s, or less than 10 s, or less than 10 s, or less than 8 s, or less than 6 s, or less than 4 s, or less than 2 s, as measured by a vertical flame test in accordance with ASTM D6143.

This disclosure is further illustrated by the following examples, which are non-limiting.

EXAMPLES

The components in Table 1 are used in the examples. All the chemicals were used as received if not mentioned elsewhere.

TABLE 1

| Acronym | Description | Source |
|---------|-------------|--------|
| TA | Tannic acid | Sigma Aldrich |
| MG | Methyl gallate | Sigma Aldrich |
| TC | Terephthaloyl chloride | Sigma Aldrich |
| NaOH | Sodium hydroxide | Sigma Aldrich |
| TBAB | Tetra-n-butylammonium bromide | Acros Organics |
| Et$_3$N | Triethylamine | Acros Organics |
| TAT | Tannic acid terephthalate | — |
| MGT | Methyl gallate terephthalate | — |
| OP1230 | Aluminum tris(diethylphosphinate) (EXOLIT™ OP 1230) | Clariant |

Physical Measurements

Physical measurements were made using the tests and test methods described below. Unless indicated otherwise, all tests are the tests in effect in the year 2010.

A TGA Q50 (TA Instruments) was used to characterize the thermal properties of the crosslinked polyphenol samples. The sample was heated at a rate of 20° C./min from room temperature to 800° C. under nitrogen. The TGA Q50 was also coupled with a Nicolet 4700 Fourier-transform infrared (FTIR) spectrometer (Thermo-Scientific) equipped with attenuated total reflectance (ATR) to study the gaseous degradation products. This facilitated the mechanistic study of the degradation process. The temperatures of the transfer line and cell were set at 215° C. and 245° C., respectively. Nitrogen at a flow rate of 50 mL/min was used to purge the decomposed gaseous products through the interface into the IR cell. 16 scans at a resolution of 4 cm$^{-1}$ were used to obtain one IR spectrum.

The TGA Q50 (TA Instruments) was also used to characterize the thermal properties of the polymer compositions including the crosslinked polyphenols. The thermal stability was evaluated by heating to 235° C. and a dwell time of 30 minutes. The overall thermal stability of composition samples was also characterized by heating at a rate of 20° C./min from room temperature to 750° C. under nitrogen.

The heat release characteristics of the crosslinked polyphenols and polymer compositions were evaluated using a micro-scale combustion calorimeter, also called PCFC (Fire Testing Technology Inc.). A 3-5 mg sample was heated from 80° C. to 750° C. at a heating rate of 1° C./second under 80 mL/min of nitrogen purge. The decomposition products were carried by the nitrogen and an additional 20 mL/min of oxygen flow into a combustor to be fully oxidized at 900° C. The oxygen consumption was measured and used to calculate heat release rate (HRR), heat release capacity (HRC), and total heat release (THR).

Example 1. Synthesis of Tannic Acid Terephthalate (TAT)

0.425 g of tannic acid (TA), 0.15 g sodium hydroxide, and 12.8 mg of phase transfer catalyst tetra-n-butylammonium bromide were dissolved into 25 mL of deionized (DI) water and purged with nitrogen. 0.75 g terephthaloyl chloride was dissolved in 25 ml chloroform in a 100 mL round bottom flask. The chloroform layer was purged with nitrogen prior to mixing with the tannic acid aqueous solution. The reaction was stirred for 15 minutes. The product that precipitated out was filtered and washed with acetone, methanol, and water. The product was dried under vacuum at 80° C. overnight. The yield was about 80% of TAT.

Example 2. Synthesis of Methyl Gallate Terephthalate (MGT)

First, 0.37 g methyl gallate (MG), 11.1 mg (3 wt % of MG) phase transfer catalyst tetra-n-butylammonium bromide, and 0.48 g sodium hydroxide were dissolved in 25 mL of DI water and sealed within a large test tube. The DI water was vacuumed and purged with nitrogen before use to minimize the oxidation of phenols. 1.22 g terephthaloyl chloride was dissolved in 25 mL chloroform in a 100 mL round bottom flask. The organic phase was purged with nitrogen to minimize oxygen content. Then the methyl gallate solution was poured into the chloroform solution to initiate the reaction. The reaction was stirred for 15 min at room temperature. The precipitate was filtered and washed with acetone, methanol, and water. The product was dried under vacuum at 80° C. overnight. The yield was about 70% of MGT. The dried product was stored in a desiccator.

MGT can also be synthesized in an organic phase (i.e. acetone) alone using methyl gallate, terephthaloyl chloride, and triethylamine. The yield by this method was about 80% of MGT.

Example 3. Thermal Degradation Evaluation

Table 2 summarizes the thermal degradation properties of MG, MGT, TA, and TAT as determined by thermal gravimetric analysis (TGA). The char yield is reported at 750° C.

TABLE 2

| Material | $T_{5\%}$ (° C.) | $T_{max}$ (° C.) | Char yield (%) |
|---|---|---|---|
| MG | 245 | 307 | 5.7 |
| MGT | 278 | 539 | 36.8 |
| TA | 185 | 333 | 27.4 |
| TAT | 299 | 531 | 36.4 |

$T_{5\%}$: the temperature at which 5% mass loss occurred
$T_{max}$: the temperature at which the maximum mass loss rate occurred For both MGT and TAT, the crosslinked product had increased thermal stability comparted to the precursors. For MGT and TAT, the $T_{max}$ increased by 232° C. and 198° C., respectively. TAT showed significantly improved $T_{5\%}$ over TA, which enabled it to be melt-processable with most plastic materials. MGT and TAT have the highest peak degradation temperatures at around 530° C. because of the thermally stable galloyl-terephthalate structures.

The thermal discoloration behavior of TA and TAT were compared as shown in FIG. 1. Both TA and TAT maintained their integrity at 175° C., except that TA turned darker. TA melted and degraded after being kept at an oven under 200° C. for 30 min. TAT showed significantly improved thermal stability even at 230° C. Only a slight color change was observed. Without being bound by theory, no melting or degradation was observed for TAT because it has more crosslinked structures. Modification of TA using terephthalate group provided the resulting TAT that did not discolor at higher temperatures typically used for processing plastics, and this aspect greatly improves the possibility of utilizing this material as a functional additive in plastics.

Figure 2:
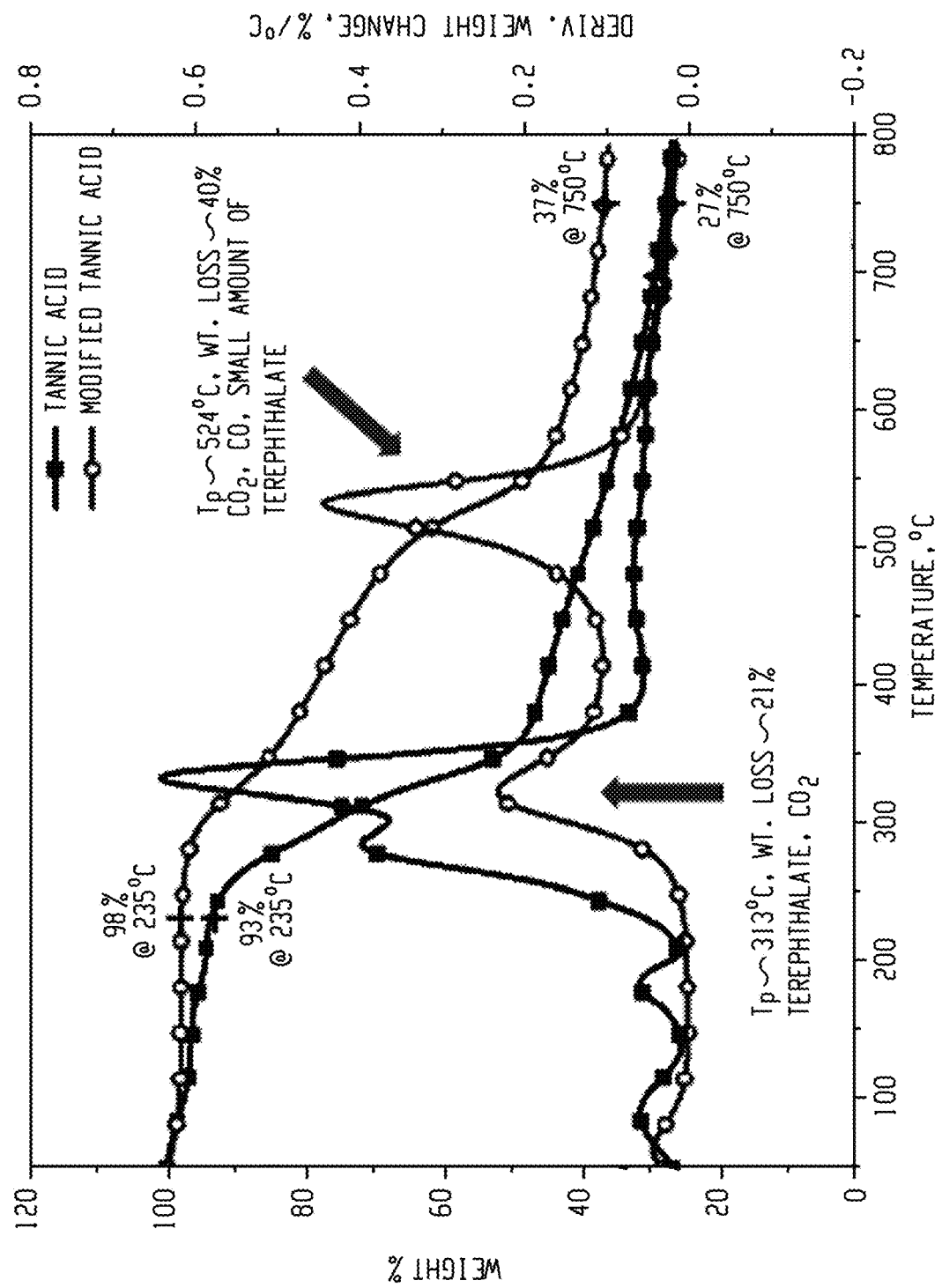
FIG. 2 is a graph of weight (%) versus temperature (° C.) and derivative weight change (percent per ° C., %/° C.) versus temperature (° C.), as obtained during thermal gravimetric analysis of tannic acid and modified tannic acid.

As shown in FIG. 2, the released gaseous species, as determined by FTIR spectroscopy, were correlated with the weight loss of TAT in TGA. About 2.5% water was first released from TAT under thermal degradation due to absorbed moisture. 21% weight loss occurred between 240 and 400° C. due to the decarboxylation of modified tannic acid and one-side attached terephthalates, compared to about 52% weight loss (mainly 1,2,3-benzene triol and carbon dioxide) from that of unmodified tannic acid. About 40% weight loss was observed at temperatures between 400 and 750° C. due to major decarboxylation of crosslinked galloyl-terephthalate structures. No phenol species could be identified in the gas phase due to crosslinking reaction in the condensed phase. The release of carbon monoxide indicated the degradation of phenoxy species. At 750° C., modified tannic acid (TAT) had 37% char remaining (a 30% increment over unmodified tannic acid).

Example 4. Pyrolysis Combustion Flow Calorimetry Evaluation of the Crosslinked Polyphenols Table 3 summarizes the flammability characteristics of MG, MGT, TA, and TAT as determined by pyrolysis combustion flow calorimetry (PCFC).

TABLE 3

| Sample | pHRR (W/g) | HRC (J/g-K) | THR (kJ/g) |
|---|---|---|---|
| MG | 170 | 235 | 14.6 |
| MGT | 46 (−73%) | 85 (−64%) | 9.7 (−34%) |
| TA | 88 | 161 | 5.6 |
| TAT | 41 (−53%) | 76 (−53%) | 6.2 (+11%) |

The oxygen consumption was constantly measured to provide the plot of heat release rate (normalized by weight) versus temperature. Total heat release (THR) is calculated based on the area under the HRR-temperature curves. Heat release capacity (HRC) is an indicator of flammability for polymer materials. It represents the maximum amount of heat released per unit mass per degree of temperature. Polymers that have HRC lower than 200 J/g-K usually self-extinguish in vertical burning test (UL-94) and have oxygen index (OI) between 30 and 40. OI represents the minimum concentration of oxygen required to sustain candle-like combustion of polymeric materials. Plastics are usually self-extinguishing in atmospheric environment with oxygen indices greater than 28. When HRC is lower than 100 J/g-K, the polymers are hard to ignite and have OI over 40.

TAT showed exceptionally low heat release characteristics with 53% reduction both on pHRR and heat release capacity (HRC), with the absolute value of HRC being lower than 100 J/g-K, and can be classified as ultra-high flame resistant materials. The significant reduction of pHRR (−73%), HRC (−64%), and THR (−34%) from the precursor compound MG indicated that the chemical modification through crosslinking of galloyl units with terephthalate groups can provide extremely low heat release properties.

The remarkably low heat release characteristics of both MGT and TAT suggest that they are both ultra-high fire resistant materials. They can provide an environmentally friendly solution for applications such as fire resistant coatings and charring additives in plastics.

Example 5. Preparation of Polymer Composition Including Crosslinked Polyphenol

A sample of TAT was ground into a fine powder and dried at 80° C. under vacuum. Nylon 6 pellets were cryogenically milled down to the size of a few hundred microns using a ZM 200 ultra-centrifugal mill (Netzsch). The collected Nylon 6 powder was then dried at 80° C. under vacuum overnight before blending.

Polymer composition samples were prepared using 5%, 10%, and 15% by weight of TAT in Nylon 6, based on the total weight of the composition. TAT and Nylon 6 pre-mixed into a blend before being added into a micro twin-screw compounder (DACA Inc.). The barrel temperature of the compounder was set at 235° C. Each sample was prepared using 3 grams of the pre-mixed powders. The mixed Nylon 6 and TAT blends were extruded immediately without circulation. The extruded samples were stored in a desiccator prior to testing.

Comparative Example 1. Preparation of Polymer Composition Including Tannic Acid

Tannic acid (TA) was grounded into fine powder and dried at 80° C. under vacuum before further use. Nylon 6 powder was prepared following the procedure of Example 5. Polymer composition samples (5 wt %, 10 wt %, and 15 wt %) were prepared as in Example 5, using TA instead of TAT. The extruded samples were stored at a desiccator prior to further testing.

Example 6. Thermal Stability of the Polymer Compositions

Table 4 summarizes the thermal degradation properties of polymer compositions including Nylon 6 and either TA or TAT, as determined by thermal gravimetric analysis (TGA). The char yield is reported at 750° C.

TABLE 4

| Sample | Max. mass loss rate (%/° C.) | Char yield (%) |
|---|---|---|
| Nylon 6 | 2.0 | 1.2 ± 0.5 |
| Nylon 6 - 5% TA | 1.8 | 2.0 ± 1.0 |
| Nylon 6 - 10% TA | 1.4 | 4.3 ± 1.0 |
| Nylon 6 - 15% TA | 1.2 | 6.6 ± 1.0 |
| Nylon 6 | 2.0 | 1.2 ± 0.5 |
| Nylon 6 - 5% TAT | 1.9 | 2.6 ± 0.5 |
| Nylon 6 - 10% TAT | 1.3 | 3.3 ± 1.0 |
| Nylon 6 - 15% TAT | 0.9 | 8.9 ± 3.5 |

Without chemical modification, TA was thermally unstable and intumescent. When TA is blended into Nylon 6, as the blend exits the micro twin-screw extruder, it tended to expand and form dark brown chunks instead of a continuous strand. This was due to severe thermal degradation of the TA. Voids left by gaseous degradation products could be seen clearly in the extruded samples. In contrast, blends containing Nylon 6 and TAT showed significant improvement in the extrudate quality with continuous strand exiting the extruder. The strand exhibited much lighter color compared to that of Nylon 6-TA blends, and no voids were observed in the cross-section of the strand due to the enhanced thermal stability of TAT.

With the addition of 15% by weight of TA, the maximum mass loss rate upon thermal degradation for the Nylon 6-TA blend was reduced by 40% (from 2.0%/° C. to 1.2%/° C.). A lower maximum mass loss rate would limit the amount of released volatiles that can potentially fuel a flame, thus influencing the sustenance of combustion. The maximum mass loss rate of Nylon 6-TAT blends with 15% by weight TAT loading was further reduced by 25% to 0.9%/° C. compared to the Nylon 6-TA blends. The lowering of the mass loss rate can further reduce the fuel supply making it beneficial in terms of improving the FR properties of Nylon blends.

Pure Nylon 6 had very little char remaining at 750° C. The char yield of Nylon 6-TA blends increased from about 2.0% to 6.6% with increasing loading of TA. The char from Nylon-TA blends is mainly attributed to the crosslinking of TA. TAT is a crosslinked molecule without a clear melting point. While blending TAT into Nylon, there is variation in the homogeneity of dispersion of TAT especially at higher loadings. This variation in dispersion during melt processing resulted in a larger spread on the data of percentage char yield in the case blends of Nylon with TAT. The increased char yield can help the formation of a thicker char layer between the flame and unexposed polymers, which can further reduce flame propagation.

Comparative Example 2. Preparation of Polymer Composition Including Commercial FR OP 1230 was obtained as a fine powder and dried at 80° C. under vacuum before further use. Nylon 6 powder was prepared following the procedure of Example 5. Polymer composition samples (10 wt % and 15 wt %) were prepared as in Example 5, using OP 1230 instead of TAT. The extruded samples were stored in a desiccator prior to further testing.

Comparative Example 3. Preparation of Polymer Composition Including Commercial FR and TA OP 1230 was obtained as a fine powder and dried at 80° C. under vacuum before further use. TAT and Nylon 6 powders were prepared following the procedure of Example 5. A polymer composition sample including 5 wt % TAT and 10 wt % OP 1230 was prepared as in Example 5. The extruded sample was stored in a desiccator prior to further testing.

Example 7. Pyrolysis Combustion Flow Calorimetry Evaluation of the Polymer Compositions Table 5 summarizes the flammability characteristics of Nylon 6, Nylon 6-TA, Nylon 6-TAT, Nylon 6-OP1230, and Nylon 6-TAT/OP 1230 compositions of Example 5 and Comparative Examples 1-3.

TABLE 5

| Sample | pHRR (W/g) | HRC (J/g-K) | THR (kJ/g) |
|---|---|---|---|
| Nylon 6 | 614 | 707 | 31.6 |
| Nylon 6 - 5% TA | 560 | 692 | 30.9 |
| Nylon 6 - 10% TA | 483 | 598 | 28.8 |
| Nylon 6 - 15% TA | 384 | 572 | 27.2 |
| Nylon 6 | 614 | 707 | 31.6 |
| Nylon 6 - 5% TAT | 523 | 559 | 29.3 |
| Nylon 6 - 10% TAT | 441 | 458 | 28.4 |
| Nylon 6 - 15% TAT | 294 | 452 | 26.1 |
| Nylon 6 - 10% OP 1230 | 512 | 546 | 31.1 |
| Nylon 6 - 15% OP 1230 | 479 | 492 | 29.3 |
| Nylon 6 - 5% TAT/10% OP1230 | 450 | 520 | 27.2 |

For Nylon 6-15% TA, pHRR, HRC and THR were reduced by 37%, 19%, and 14%, respectively, compared to Nylon 6. For Nylon 6-15% TAT, pHRR, HRC, and THR were reduced by 52%, 36%, and 17%, respectively. Although the residual terephthalate and galloyl units from modified tannic acid can cause the degradation of Nylon 6 at lower temperatures, the interaction between polyamide molecules and galloyl-terephthalate moieties at higher temperatures contributed to provide significantly lower heat release properties. The Nylon 6 polymer compositions that were similarly prepared using OP 1230 demonstrated inferior flame resistant properties compared to all samples that included TAT in the polymer composition as the sole FR agent.

Example 8. Preparation of a Nylon 6,6 Fabric Coated with TAT 0.85 g tannic acid, 0.3 g sodium hydroxide, 26 mg tetra-n-butylammonium bromide, and 1 g sodium lauryl sulfate were dissolved in 125 mL DI water. The solution was poured into a terephthaloyl chloride-chloroform solution. The reaction was constantly stirred for 30 minutes. After the reaction, 50 mL of an acetic acid aqueous solution (containing 30 microliters of acetic acid) was added to the mixed suspension. The organic phase and clear aqueous phase were removed by centrifugation. An orange-colored gel layer between the two phases was collected for coating on the Nylon 6,6 fabric.

The concentrated modified tannic acid gel (concentration: approximately 1 g/5 mL) was diluted in about 50 mL of DI water. 0.5 mL of acetic acid was added to the solution for adjusting the acidity. The Nylon 6,6 fabric samples having dimensions of 50.8 mm wide and 127 mm long were washed three times with DI water to remove residual contaminants. The washed fabric samples were then immersed in the tannic acid gel suspension and heated to 100° C. for one hour. After cooling to room temperature, the fabric samples were washed three times with DI water and then dried at room temperature. The samples were washed one additional time with DI water after drying. The washed samples were then dried again and ironed to minimize wrinkles. The applied coating increased the weight of the fabric samples by 6.1±1.0%.

Example 9. Vertical Flame Test of Modified Tannic Acid-Coated Nylon 6,6 Fabric Table 6 is a summary of the burning behavior in the vertical flame test for the coated fabric samples prepared in Example 8.

TABLE 6

| Sample | Burning rate (inch/second) | After-flame time (second) | Char length (inch) |
| --- | --- | --- | --- |
| Nylon 6,6 | 0.5 | 18 | 5 |
| TA-coated Nylon 6,6 | 0.4 | 25 | 5 |
| TAT-coated Nylon 6,6 | 0.25 | 0 | 3 |

Vertical flame tests in accordance with ASTM D6143 were performed using Nylon 6,6, TA-coated Nylon 6,6 (after washing), and TAT-coated Nylon 6,6 (after washing), as prepared in Example 8. Burning rate was calculated based on the height of the flame can reach within the first 10 seconds. After-flame time was recorded after the ignition source is removed. It was mainly determined by whether the FR-coated fabric had self-extinguishing characteristic. Char length was defined by the distance between the bottom of the samples and the farthest point that the flame can reach. It is an indicator of the flame resistance of textiles.

Nylon 6,6 fabric exhibited 18 seconds after-flame time. The neat fabric melted and dripped continuously during the test. It did not stop burning until the majority of the fabric within the sample holder was consumed after removing the ignition source. TA-coated Nylon 6,6 fabric (after washing) was tested as a control sample. Nylon 6,6 fabric became very stiff with simply 6 wt % TA coating on the fiber surface. Due to the high solubility of TA in water, most TA coating was removed after washing with DI water. Accordingly, the burning behavior of the washed TA-coated Nylon 6,6 fabric was similar to that of neat Nylon 6,6 fabric.

After coating using the TAT suspension, Nylon 6,6 fabric exhibited a light yellow color and the flexibility of the fabric was not affected. After a repeated rinsing and drying process, the TAT-coated Nylon 6,6 fabric exhibited self-extinguishing behavior before the ignition source was removed. An intumescent and carbonaceous char layer was formed on the burning front preventing the fabric from continuous burning. No after-flame time was observed during the burning. These burning characteristics indicated a significant improvement in flame resistance of Nylon 6,6 fabric in presence of TAT coating. The insolubility of TAT provided washing resistance comparing with TA.

Without being bound by theory, it is believed that the use of acidic aqueous solution and high temperature for Nylon coating can provide both electrostatic bonding and hydrogen bonding between amine/amide groups in Nylon fibers and phenolic hydroxyl groups in TAT molecules. Although the coating technique did not render covalent bonding between TAT and the Nylon fibers, the remaining phenolic hydroxyl groups in TAT molecules can provide access to further crosslinking with Nylon fibers for preparing durable FR coating.

Figure 3:
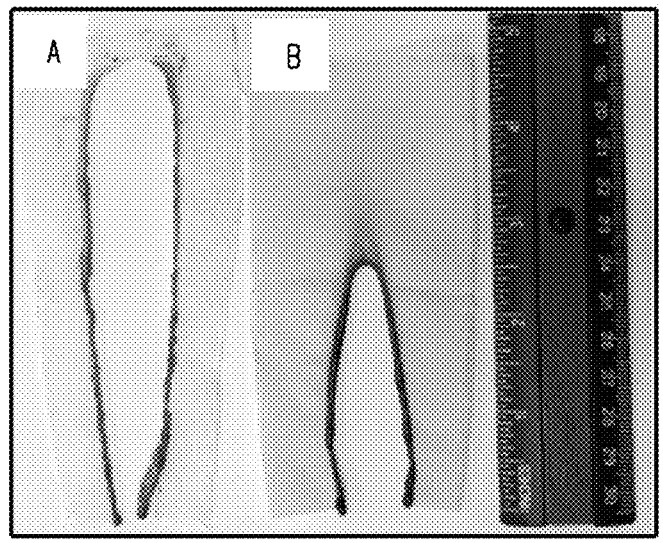
FIG. 3 shows a photographic image of an uncoated, burned Nylon 6,6 fabric sample A and a TAT-coated, burned Nylon 6,6, fabric sample B according to an embodiment.

The burned fabric samples are shown in FIG. 3. Neat Nylon 6,6 fabric (after washing) exhibited a 5 inch char length and TAT-coated Nylon 6,6 fabric (after washing) exhibited a 3 inch char length. The charring characteristics of TAT improved the flame resistance of the neat Nylon 6,6 fabric. A char length less than 4 inches and an after-flame time of less than 2 seconds are typically sufficient for a flame resistant fabric, according to ASTM F 1506, which describes specific requirements for FR textiles. Thus, TAT is a suitable example of an FR coating material, which can be used for Nylon fabrics.

Example 10. SEM Imaging

Figure 4:
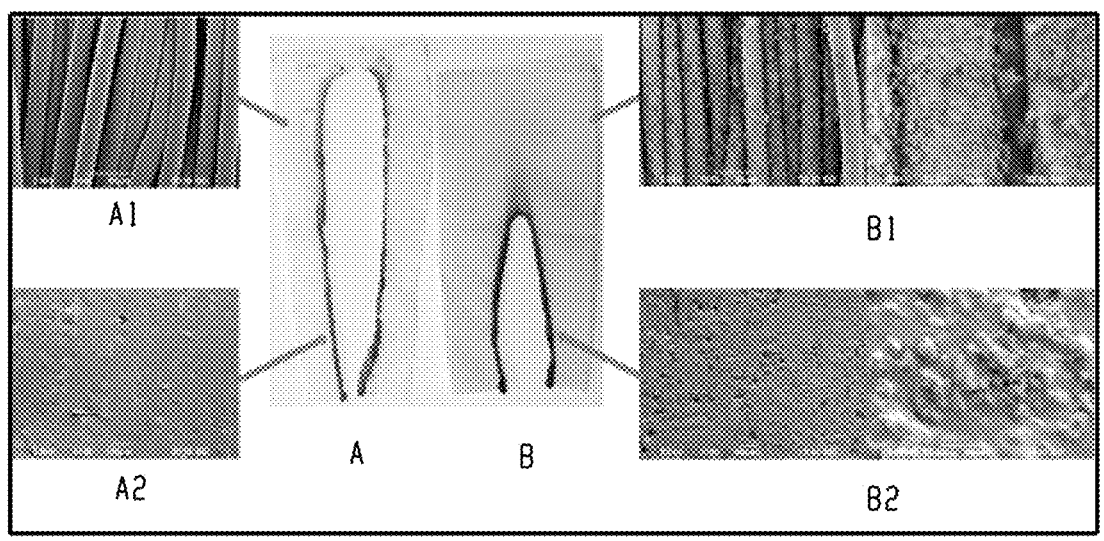
FIG. 4 is scanning electron micrograph (SEM) images of uncoated Nylon 6,6 sample A of FIG. 3 before burning (A1) and after burning (A2); and of and a TAT-coated Nylon 6,6 fabric sample B of FIG. 3 before burning (B1) and after burning (B2) according to an embodiment.

The morphology of pristine Nylon 6,6 fabric and TAT-coated fabric samples before and after the vertical flame test were observed using SEM. The change of morphology and the evolution of char upon combustion were studied by imaging appropriate locations on the burned sample, as shown in FIG. 4. The uncoated Nylon 6,6 fibers are smooth at the micron scale since these fibers are produced by melt-spinning process. The TAT-coated Nylon fibers exhibit evenly distributed micron sized particles of TAT. In the case of uncoated Nylon 6,6, the burning process melted and coalesced the fibers together. A smooth surface (at the micron scale) with very little debris was observed in the SEM micrographs. The TAT-coated Nylon 6,6 fibers' melting behavior was similar to that of uncoated fibers. However, from the SEM micrographs, it is clear that TAT particles exhibit intumescence and are partially embedded into the surface of the molten fibers. These TAT particles appear to be transformed into thermally stable char of larger dimensions. Eventually, the charred TAT particles agglomerate and cover significant portion of the surface exposed to the flame thus forming a thermally stable barrier and preventing flame spread.

Figure 5:
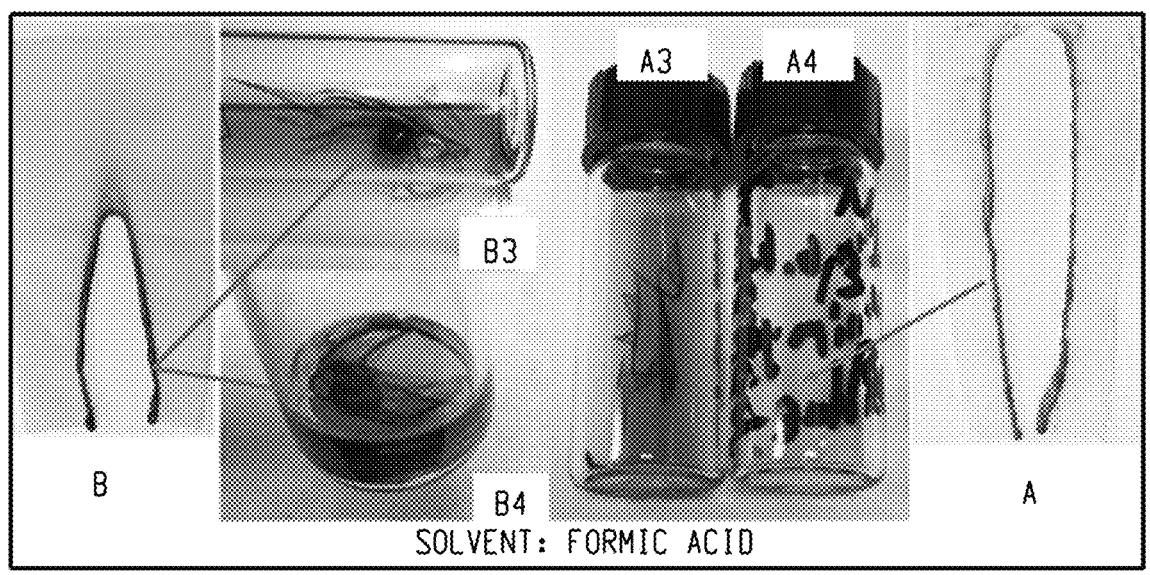
FIG. 5 shows a photographic image of the burn residues B3 and B4 TAT-coated Nylon 6,6 fabric sample B of FIG. 3 according to an embodiment and the burn residues A3 and A4 of uncoated Nylon 6,6 sample A of FIG. 3.

The residue of samples obtained from burnt uncoated Nylon 6,6 fabric dissolved completely into pure formic acid (a well-known solvent for Nylon 6,6) as shown in FIG. 5. It is well-known that Nylon 6,6 does not char upon burning. The residue is composed of partially degraded and oxidized Nylon 6,6 molecules. The partially burned Nylon 6,6 also dissolved in formic acid. However, the burnt residue of TAT-coated Nylon 6,6 fabric did not dissolve in formic acid completely. A thin layer of film remained undissolved in the formic acid. This thin layer of film was also observed in unmodified tannic acid-coated Nylon 6,6.

Figure 6:
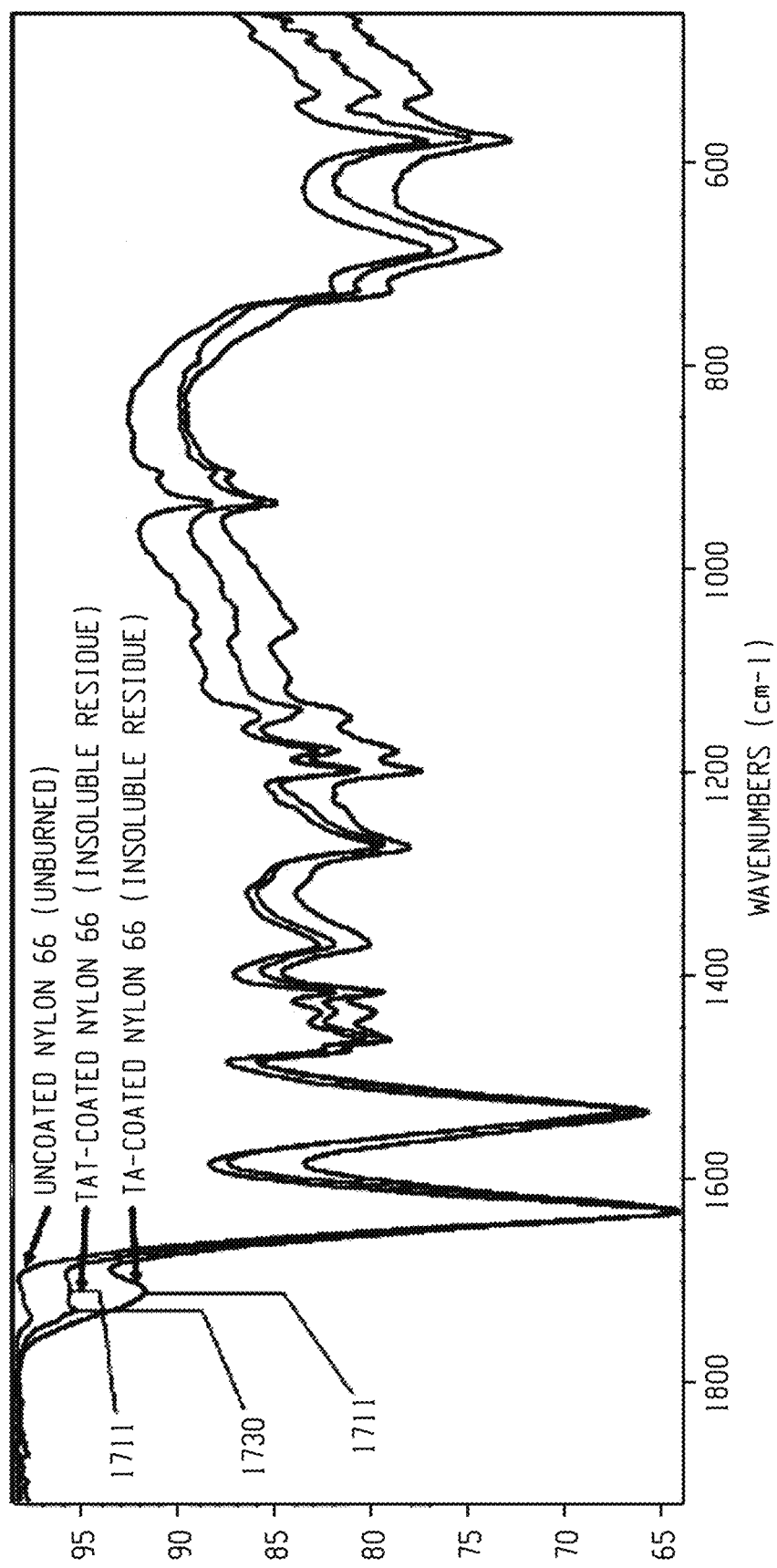
FIG. 6 is a graph of intensity (arbitrary units) versus wavenumber ($cm^{-1}$), of an unburned, uncoated TAT sample, an insoluble residue of a burned TAT-coated Nylon 6,6 sample in accordance with an embodiment, and a burned TA-coated nylon 6,6 sample in accordance with an embodiment.

The insoluble burnt residue was washed extensively with formic acid before an FTIR spectrum was obtained. The residue also does not dissolve in a wide range of solvents, such as dimethyl formamide, alcohol, chloroform, toluene, and acetone. The residue from both TAT- and TA-coated Nylon 6,6 fabric exhibited similar spectra to that of unburnt Nylon 6,6 fabric, except an extra carbonyl absorption peak at about 1700 $cm^{-1}$ region, as shown in FIG. 6. Therefore, the insoluble burning residue at the surface of TAT or TA-coated Nylon 6,6 fabric is a thin layer of crosslinked Nylon 6,6 film induced by the char of TAT or TA molecules. It has been reported surface crosslinking can be an effective FR strategy for polyamides. The observed induced surface crosslinking and the formation of a barrier char layer from the TAT-coated Nylon 6,6, fabric were effective in imparting flame retardant characteristics.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, or the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements can be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination comprising at least one of the foregoing; "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=$CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—$CH_2$—) or, propylene (—$(CH_2)_3$—)). "Cycloalkylene" means a divalent cyclic alkylene group, —$C_nH_{2n-x}$, wherein x is the number of hydrogens replaced by cyclization(s). "Alkylidene" means a straight or branched chain, saturated divalent hydrocarbon group, with both valences on a single common carbon atom. "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). "Alkylaryl" means an aryl group that has been substituted with an alkyl group as defined above, with 4-methylphenyl being an exemplary alkylaryl group. "Arylalkyl" means an alkyl group that has been substituted with an aryl group as defined above, with benzyl being an exemplary arylalkyl group. "Acyl" means an alkyl group as defined above with the indicated number of carbon atoms attached through a carbonyl carbon bridge (—C(=O)—). "Alkoxy" means an alkyl group as defined above with the indicated number of carbon atoms attached through an oxygen bridge (—O—). "Aryloxy" means an aryl group as defined above with the indicated number of carbon atoms attached through an oxygen bridge (—O—). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one chain or ring member that is a heteroatom (e.g., 1, 2, or 3 heteroatom(s)), wherein the heteroatom(s) is each independently N, O, S, Si, or P. Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Exemplary groups that can be present on a substituted position include, but are not limited to, nitro (—$NO_2$), cyano (—CN), hydroxy (—OH), halogen, thiol (—SH), thiocyano (—SCN), azido; alkanoyl (such as a $C_{2-6}$ alkanoyl group such as acyl); carboxamido; $C_{1-6}$ or $C_{1-3}$ alkyl; $C_{1-6}$ haloalkyl; $C_{5-18}$ cycloalkenyl; $C_{2-6}$ alkenyl; $C_{2-6}$ alkynyl (including groups having at least one unsaturated linkages and from 2 to 6 carbon atoms); $C_{1-6}$ or $C_{1-3}$ alkoxys; $C_{1-6}$ haloalkoxy; $C_{3-12}$ cycloalkyl; $C_{5-18}$ cycloalkenyl; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy; $C_{7-13}$ arylalkylene (e.g., benzyl); $C_{7-12}$ alkylarylene (e.g., toluyl); $C_{4-12}$ heterocycloalkyl; $C_{3-12}$ heteroaryl; $C_{1-6}$ alkyl sulfonyl (—S(=O)$_2$-alkyl); $C_{6-12}$ arylsulfonyl (—S(=O)$_2$-aryl); or tosyl (CH$_3$C$_6$H$_4$SO$_2$—). When a compound is substituted, the indicated number of carbon atoms is the total number of carbon atoms in the compound or group, including those of any substituents.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of forming a crosslinked polyphenol, the method comprising polycondensing
    a bio-based phenolic compound comprising at least one phenolic hydroxyl group, with
    a crosslinking agent comprising at least two functional groups reactive with the phenolic hydroxyl group, wherein the at least two functional groups are each independently a halogen group, acid halide group, sulfonyl halide group, anhydride group, or a combination comprising at least one of the foregoing,
    to provide the crosslinked polyphenol.

2. The method of claim 1, wherein the bio-based phenolic compound is a condensed tannin, a hydrolysable tannin, or a combination comprising at least one of the foregoing.

3. The method of claim 1, wherein the bio-based phenolic compound is quercetin, catechin, epicatechin, anthocyanidin, gallic acid, digallic acid, methyl gallate, ellagic acid, hexahydroxydiphenic acid, luteic acid, casuarictin, gallotannin, ellagitannin, or a combination comprising at least one of the foregoing.

4. The method of claim 1, wherein the crosslinking agent is
   a phthaloyl halide of the formula:

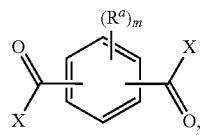

a halobenzene of the formula:

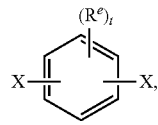

or a combination comprising at least one of the foregoing, wherein, in the formulae,
   each $R^a$ is the same or different, and is $C_{1-12}$ alkyl, $C_{6-12}$ aryl, or -A-(C=O)X;
   each $R^e$ is the same or different, and is $C_{1-12}$ alkyl, $C_{6-12}$ aryl, or —X;
   each A is the same or different, and is O or N;
   each X is the same or different, and is a halogen; and
   and t are each independently 0 to 4.

5. The method of claim 1, wherein the crosslinking agent is phthaloyl chloride, dichlorobenzene, trichlorobenzene, 3,3',4,4'-biphenyltetracarboxylic dianhydride, 4,4'-oxydiphthalic anhydride, 4,4'-(4,4'-isopropylidenediphenoxy)bis (phthalic anhydride), benzophenone-3,3',4,4'-tetracarboxylic dianhydride, benzene-1,3-disulfonyl chloride, biphenyl-4,4'-disulfonyl chloride, 4,4'-methylenebis(benzenesulfonyl chloride), 9-oxo-9H-fluorene-2,7-disulfonyl dichloride, P,P-dichlorophenylphosphine, dimethylphosphoramidous dichloride, diphenylphosphoramidous dichloride, dichloromethylphosphine, dichloro(phenyl)phosphine sulfide, dimethylphosphoramidous dichloride, trimesoyl chloride, cyanuric chloride, 1,3,5-triphosphinine-2,4,6-chloride, or a combination comprising at least one of the foregoing.

6. The method of claim 1, wherein the crosslinked polyphenol has
    a weight loss of less than or equal to 3 weight percent, as determined by thermogravimetric analysis comprising heating the crosslinked polyphenol from 23 to 235° C. at a rate of 20° C. per minute; and
    a char yield of at least 35 weight percent, as determined by thermogravimetric analysis comprising heating the crosslinked polyphenol from 23 to 750° C. at a rate of 20° C. per minute.

7. The method of claim 1, wherein the bio-based phenolic compound and the crosslinking agent are present in an amount effective to provide a reaction mixture wherein a mole ratio of phenolic hydroxyl groups to functional groups is 0.4:1 to 2:1.

8. The method of claim 1, wherein the bio-based phenolic compound is disposed on a surface of an inorganic particle comprising a metal hydroxide, a metal oxide, or a combination comprising at least one of the foregoing.

9. A crosslinked polyphenol produced by the method of claim 1.

10. A polymer composition comprising:
    a polymer; and
    2 to 30 weight percent of a crosslinked polyphenol, based on the total weight of the polymer and the crosslinked polyphenol, produced by a method comprising polycondensing
    a bio-based phenolic compound comprising at least one phenolic hydroxyl group,
    with
    a crosslinking agent comprising at least two functional groups reactive with the phenolic hydroxyl group, wherein the at least two functional groups are each independently a halogen group, acid halide group, sulfonyl halide group, anhydride group, or a combination comprising at least one of the foregoing, to provide the crosslinked polyphenol.

11. The polymer composition of claim 10, wherein the bio-based phenolic compound is a condensed tannin, a hydrolysable tannin, or a combination comprising at least one of the foregoing.

12. The polymer composition of claim 10, wherein the crosslinking agent is
a phthaloyl halide of the formula:

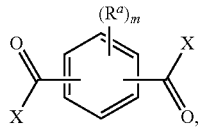

a halobenzene of the formula:

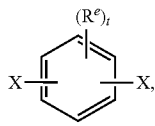

or a combination comprising at least one of the foregoing, wherein, in the formulae,
each $R^a$ is the same or different, and is $C_{1-12}$ alkyl, $C_{6-12}$ aryl, or -A-(C=O)X;
each $R^e$ is the same or different, and is $C_{1-12}$ alkyl, $C_{6-12}$ aryl, or —X;
each A is the same or different, and is O or N;
each X is the same or different, and is a halogen; and
and t are each independently 0 to 4.

13. The polymer composition of claim 10, wherein the polymer comprises a thermoplastic, a thermoplastic elastomer, an elastomer, a thermoset, or a combination comprising at least one of the foregoing.

14. The polymer composition of claim 10, further comprising 1 to 40 parts by weight of a secondary flame retardant or a flame retardant synergist.

15. The polymer composition of claim 14, wherein the secondary flame retardant or the flame retardant synergist comprises an organophosphate ester, a metal di($C_{1-12}$alkyl) phosphinate, a bis(phenoxy)phosphazene, a melamine flame retardant, a metal hydroxide, a metal oxide, or a combination comprising at least one of the foregoing.

16. The polymer composition of claim 10, wherein at least a portion of the crosslinked polyphenol is present in the form of particles surface-coated with the crosslinked polyphenol.

17. The polymer composition of claim 10, having
a heat release capacity of less than or equal to 80 joules/gram-Kelvin, as determined by pyrolysis combustion flow calorimetry; and
a peak heat release rate of less than or equal to 50 watts/gram, as determined by pyrolysis combustion flow calorimetry.

18. A flame-retardant fabric comprising:
a woven or non-woven fabric substrate; and
a coating on a surface of the fabric substrate, the coating comprising the crosslinked polyphenol of claim 1,
wherein the bio-based phenolic compound is a condensed tannin, a hydrolysable tannin, or a combination comprising at least one of the foregoing, and
wherein the bio-based phenolic compound and the crosslinking agent are present in an amount effective to provide a reaction mixture wherein a mole ratio of phenolic hydroxyl groups to functional groups is 0.4:1 to 2:1.

19. The flame-retardant fabric of claim 18, wherein the crosslinking agent is
a phthaloyl halide of the formula:

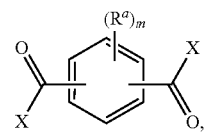

a halobenzene of the formula:

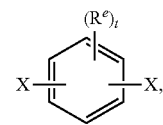

or a combination comprising at least one of the foregoing, wherein, in the formulae,
each $R^a$ is the same or different, and is $C_{1-12}$ alkyl, $C_{6-12}$ aryl, or -A-(C=O)X;
each $R^e$ is the same or different, and is $C_{1-12}$ alkyl, $C_{6-12}$ aryl, or —X;
each A is the same or different, and is O or N;
each X is the same or different, and is a halogen; and
and t are each independently 0 to 4.

20. The flame-retardant fabric of claim 19, wherein the coating forms an intumescent char and induces surface crosslinking of a fiber of the substrate upon burning.

* * * * *